(12) United States Patent
Schütte et al.

(10) Patent No.: US 9,126,386 B2
(45) Date of Patent: Sep. 8, 2015

(54) COMPOSITE ELEMENTS

(75) Inventors: Markus Schütte, Osnabrueck (DE); Frank Fechner, Melle (DE); Manfred Genz, Ostercappeln (DE)

(73) Assignee: BASF SE, Ludwigshafen (DE)

( * ) Notice: Subject to any disclaimer, the term of this patent is extended or adjusted under 35 U.S.C. 154(b) by 630 days.

(21) Appl. No.: 13/410,616

(22) Filed: Mar. 2, 2012

(65) Prior Publication Data

US 2012/0225280 A1 Sep. 6, 2012

Related U.S. Application Data

(60) Provisional application No. 61/449,107, filed on Mar. 4, 2011.

(51) Int. Cl.
| | |
|---|---|
| B32B 5/18 | (2006.01) |
| B32B 37/00 | (2006.01) |
| B32B 37/10 | (2006.01) |
| B29C 65/00 | (2006.01) |
| B32B 15/04 | (2006.01) |
| B32B 15/08 | (2006.01) |
| B32B 3/04 | (2006.01) |

(52) U.S. Cl.
CPC . *B32B 5/18* (2013.01); *B29C 65/00* (2013.01); *B29C 66/00145* (2013.01); *B32B 3/04* (2013.01); *B32B 15/04* (2013.01); *B32B 15/046* (2013.01); *B32B 15/08* (2013.01); *B32B 37/00* (2013.01); *B32B 37/10* (2013.01); *B32B 2255/205* (2013.01); *B32B 2266/0278* (2013.01); *B32B 2266/0285* (2013.01); *B32B 2266/06* (2013.01); *B32B 2266/08* (2013.01); *B32B 2307/3065* (2013.01); *B32B 2307/7242* (2013.01); *Y10T 428/249992* (2015.04)

(58) Field of Classification Search
CPC B29C 63/00; B29C 63/0047; B29C 63/0065; B29C 63/0091; B29C 63/20; B29C 65/00; B29C 65/02; B29C 65/44; B29C 65/46; B29C 65/48; B29C 65/782; B29C 66/00; B29C 66/001; B29C 66/00145; B29C 66/71; B29C 66/712; B29C 66/723; B29C 66/7232; B29C 66/72322; B29C 66/727; B29C 66/7234; B29C 66/74; B29C 66/742; B29C 66/7422; B29C 66/744; B32B 5/18; B32B 5/22; B32B 7/12; B32B 9/041; B32B 9/045; B32B 9/046; B32B 15/00; B32B 15/04; B32B 15/043; B32B 15/046; B32B 15/08; B32B 15/095; B32B 27/00; B32B 27/06; B32B 27/065; B32B 27/40; B32B 37/00; B32B 37/10; B32B 37/1009; B32B 37/1018

USPC ........... 156/285, 286, 382; 264/46.8, 87, 511, 264/526, 553, 566, 568, 571, 101, 102; 425/85, 504, 546, 388, 405.1, 405.2
See application file for complete search history.

(56) References Cited

U.S. PATENT DOCUMENTS

| | | | | | |
|---|---|---|---|---|---|
| 5,900,299 | A | * | 5/1999 | Wynne | 428/69 |
| 2006/0088685 | A1 | * | 4/2006 | Echigoya et al. | 428/69 |
| 2011/0218259 | A1 | | 9/2011 | Eling et al. | |
| 2011/0218262 | A1 | | 9/2011 | Eling et al. | |
| 2011/0218324 | A1 | | 9/2011 | Zarbakhsh et al. | |
| 2011/0263737 | A1 | | 10/2011 | Fricke et al. | |
| 2011/0263742 | A1 | | 10/2011 | Zarbakhsh et al. | |
| 2012/0067499 | A1 | | 3/2012 | Elbing et al. | |
| 2012/0070671 | A1 | | 3/2012 | Genz et al. | |

FOREIGN PATENT DOCUMENTS

| | | |
|---|---|---|
| EP | 0 074 593 A1 | 3/1983 |
| EP | 2 072 548 A2 | 6/2009 |
| WO | WO 96/23823 A1 | 8/1996 |
| WO | WO 97/46608 A1 | 12/1997 |
| WO | WO 01/32400 A1 | 5/2001 |
| WO | WO 2004/098878 A1 | 11/2004 |
| WO | WO 2006/040097 A1 | 4/2006 |
| WO | WO 2006/120183 A1 | 11/2006 |
| WO | WO 2007/065847 A1 | 6/2007 |
| WO | WO 2008/135550 A2 | 11/2008 |
| WO | WO 2010/125012 A1 | 11/2010 |
| WO | WO 2010/125013 A1 | 11/2010 |
| WO | WO 2010/125038 A1 | 11/2010 |
| WO | WO 2011/039082 A1 | 4/2011 |
| WO | WO 2011/107366 A1 | 9/2011 |
| WO | WO 2011/107367 A1 | 9/2011 |
| WO | WO 2011/107374 A1 | 9/2011 |
| WO | WO 2011/134856 A1 | 11/2011 |
| WO | WO 2011/134866 A2 | 11/2011 |

OTHER PUBLICATIONS

U.S. Appl. No. 13/432,820, filed Mar. 28, 2012, Fricke, et al.
U.S. Appl. No. 13/590,571, filed Aug. 21, 2012, Emge, et al.
U.S. Appl. No. 13/318,225, filed Dec. 7, 2011, Genz, et al.
U.S. Appl. No. 61/309,469, filed Mar. 2, 2010, Eling, et al.
U.S. Appl. No. 61/309,471, filed Mar. 2, 2010, Zarbakhsh, et al.
U.S. Appl. No. 61/309,473, filed Mar. 2, 2010, Eling, et al.
U.S. Appl. No. 61/327,740, filed Apr. 26, 2010, Zarbakhsh, et al.
U.S. Appl. No. 61/327,741, filed Apr. 26, 2010, Fricke, et al.
U.S. Appl. No. 61/385,162, filed Sep. 22, 2010, Elbing, et al.

\* cited by examiner

*Primary Examiner* — Richard Crispino
*Assistant Examiner* — Matthew Hoover
(74) *Attorney, Agent, or Firm* — Oblon, McClelland, Maier & Neustadt, L.L.P.

(57) ABSTRACT

The invention relates to a composite element comprising
a) a core made of a foam or of a porous material,
b) an outer layer applied to the core a), and,
c) a foil c) made of a thermoplastic and differing from the outer layer b).

11 Claims, No Drawings

COMPOSITE ELEMENTS

The invention relates to composite elements composed of a plastics-foil-coated core made of foam or of a porous material.

Composite elements made of a foam core surrounded by at least one outer layer are well-known. They have decorative functions, but are preferably used for thermal insulation, for example on buildings or in refrigeration equipment.

Refrigeration equipment is very important in both the commercial sector and the private sector. It is mostly produced by manufacturing a casing into which a liquid mixture made of a rigid polyurethane foam system is introduced, and the system hardens in the casing to give the polyurethane.

"Vacuum insulation panels" also abbreviated to VIPs, have been used in recent times to reduce thermal conductivity. These, too, are mostly introduced into the casings and are surrounded there with rigid polyurethane foam.

These processes are inconvenient. In particular when VIPs are incorporated, a fixing process is necessary. During transport and during further handling, and also during the foaming process around VIPs, there is also the risk of damage to the VIPs, for example in the region of the welds.

The Permaskin process is a known method for use of a plastics foil to sheath substrates. It is described by way of example in WO 01/32400.

Here, a molding is arranged in a chamber between two thermoplastic foils separated from one another, and is fixed, and then the air is evacuated from the chamber, and the foil is thus pressed on to the surface of the molding, while a vacuum is maintained between the foils. The foil here is preferably heated, in particular to a temperature above the softening point of the foil.

The rigid polyurethane foams used in the thermal/low-temperature-insulation sector can in principle also be used as substrate. The application WO 2008/135550 describes this. Bilaterally coated rigid foam elements thus produced exhibit increased loadbearing capability, resistance to breakage, and resistance to weathering, and also improved feel, and barrier action with respect to the ingress of liquids. The example given coats a rigid foam made of Neopolen. Reference is made to the fact that rigid polyurethane foams can be used. The rigid foams used do not have any further previously applied functional layers.

However, moldings produced in this way have only inadequate long-term insulation properties, because of gas-exchange processes. Furthermore, resistance to mechanical loads is only low, examples being loads that can arise on contact with pointed or sharp-edged articles.

The object of the present invention was to provide composite elements which can be used for refrigeration equipment and which optionally permit the incorporation of VIPs. They are intended to be easy to produce, and to have good mechanical strength and low intrinsic weight. A further intention is that it be possible to apply decorative layers.

Surprisingly, the object was achieved via the subject matter of the invention, namely a composite element comprising
a) a core made of a foam or of a porous material,
b) an outer layer applied to the core a), and,
c) a foil made of a thermoplastic and differing from the outer layer b).

The invention further provides the production of the composite elements, and also the use thereof, in particular for producing refrigeration equipment.

The core a) is preferably one selected from the group comprising foams and porous materials.

The foams a) are preferably selected from the group comprising melamine-formaldehyde foams, rigid open-cell polyurethane foams, and rigid closed-cell polyurethane foams.

The porous materials are preferably monolithic organic or inorganic polymers, hereinafter also termed monoliths. Among the monoliths, particular preference is given to aerogels. Aerogels are gels which have pores and have been dried under supercritical conditions.

In one preferred embodiment of the invention, the core a) is a foam, in particular a rigid foam. The foams are open-cell or closed-cell foams, and this varies with the application sector of the composite elements. The open-cell foams can be melamine-formaldehyde foams or rigid polyurethane foams, preferably rigid polyurethane foams, and in particular rigid open-cell polyurethane foams.

For the purposes of the invention, rigid foams are foams to DIN 7726 (05/1982), where these exhibit relatively high resistance to deformation under compressive load (compressive stress for 10% compression, or compressive strength to DIN 53421, 06/1984, ≥80 kPa).

The rigid polyurethane foams used as core a) are known. The open-cell foams, which can be evacuated, have also been widely described, for example in EP 2072548. The foams can be used as core a) without further pretreatment. WO 2006/120183 says that the foam can be compressed to improve ease of evacuation.

The melamine-formaldehyde foams are likewise known, for example from EP 74593. Products of this type are marketed by way of example by BASF SE as Basotect®.

Aerogels that can be used as core a) are described by way of example in WO 2007/065847.

The outer layer b) is preferably selected from the group comprising barrier layers with respect to gases, also termed diffusion barriers, where water vapor is also regarded as gas, flame-retardant layers, and mechanically supportive layers.

The diffusion barriers preferably involve foils impermeable to water vapor and to other gases.

The flame-retardant barriers preferably involve thin-layer mats made of mineral wool, alkali metal silicate layers, as described by way of example in WO 2006/040097, or layers made of other known flame retardants, such as phosphorus, graphite, melamine, or antimony trioxide.

The mechanically supportive coatings preferably involve single- or multilayer systems made of paperboard, plastic, or sheetmetal, and these can optionally also have been reinforced by a honeycomb structure located thereunder.

It is particularly preferable that, as described, the diffusion barriers used as outer layer b) involve foils.

The outer layer b) can, in the simplest case, involve a metal layer, preference being given here to foils made of aluminum. The outer layer b) is preferably a composite foil.

It is particularly preferable that the outer layer b) involves a multilayer composite foil with a metal layer applied by metallization or by lamination.

It is particularly preferable that the metal layer of the foil used as outer layer b) is composed of aluminum.

Accordingly, the outer layer b) is in particular an aluminum foil or an aluminum composite foil.

The foil used as outer layer b) is in particular itself composed of polyester, polyvinyl chloride, polyolefins, such as polyethylene or polypropylene, or polyvinyl alcohol.

In the sector of vacuum insulation panels, for the subsequent sealing process, preference is given to aluminum composite foils b), composed of an aluminum layer with a thickness of about 6 micrometers and of a polyethylene layer, or to metalized high-barrier laminates composed of Al-metalized polyethylene laminates or of Al-metalized polyethylene terephthalate laminates, where the thickness of the Al layer here is only from 30 to 100 nm. The metalized high-barrier laminates are composed at least of two Al layers in order to inhibit ingress of small molecules, e.g. water, by lengthening the diffusion paths. However, in the case of thermal insulation applications of the composite elements, the thickness of the metal layer should certainly not exceed a number of micrometers, since otherwise the heat loss through thermal bridging, and in particular through dissipation at corners, becomes excessive.

In one preferred embodiment of the invention, the outer layer b) is a foil which completely encloses the core a). It is particularly preferable that the outer layer b) is, as described, a gas-impermeable foil. In this embodiment of the invention, the core a) has preferably been evacuated.

In this embodiment, it is preferable that the abovementioned open-cell foams are used as core a), examples being melamine-formaldehyde foams and rigid open-cell polyurethane foams. The core a) has been completely sheathed by the outer layer b), and has been sealed so as to be gastight.

As stated above, the foil c) is composed of a thermoplastic. This is preferably selected from the group comprising polyvinyl chloride, styrene copolymers, polypropylene, polyvinylidene fluoride, thermoplastic polyurethane (TPU), and polymethyl methacrylate (PMMA), and mixtures made of thermoplastic polyurethane and of styrene copolymers.

Foils of this type are known and are described by way of example in WO2004/098878.

The thickness of the foils c) used is preferably from 50 to 750 µm, with preference from 100 to 500 µm, and with particular preference from 200 to 350 µm. They can be produced from the corresponding starting materials in pellet form, by the known processes of foil production. Blow foils or cast foils can be involved here, and for production of cast foils here the extrusion process is preferred.

In order to improve adhesive properties, the foils can have been subjected to a Corona treatment on one or else on both sides.

WO2008/135550 describes a specific embodiment of the foil c). This is composed of mixtures comprising thermoplastic polyurethane (TPU) and an acrylonitrile-styrene-acrylate copolymer (ASA).

Said mixtures (1) comprise from 1% by weight to 40% by weight, preferably from 3% by weight to 30% by weight, particularly preferably from 5% by weight to 25% by weight, of (A) thermoplastic polyurethane, in particular based on aliphatic isocyanate, and from 60% by weight to 99% by weight, preferably from 70% by weight to 97% by weight, particularly preferably from 75% by weight to 95% by weight, of (B) acrylonitrile-styrene-acrylate copolymer (ASA) and/or acrylonitrile-ethylene homo- or copolymer-styrene (AES) material, preferably acrylonitrile-styrene-acrylate copolymer (ASA), based in each case on the total weight of the mixture (1), preferably based on the total of the weights of (A) and (B) in the mixture (1).

The ASA (B) is preferably based on:
(B1) from 10 to 90% by weight of at least one graft rubber based on
(B11) from 50 to 95% by weight of a graft base produced using
(B111) from 70 to 99.9% by weight of at least one alkyl acrylate
(B112) from 0.1 to 30% by weight of at least one at least bifunctional crosslinking agent,
(B113) from 0 to 29.9% by weight of at least one other copolymerizable monomer,
(B12) from 5 to 50% by weight of a graft shell based on
(B121) from 65 to 90% by weight, preferably from 70 to 80% by weight, of at least one vinylaromatic monomer,
(B122) from 10 to 35% by weight, preferably from 20 to 30% by weight, of at least one polar, copolymerizable unsaturated monomer, preferably acrylonitrile and/or methacrylonitrile,
(B123) from 0 to 25% by weight of at least one other copolymerizable comonomer,
(B2) from 10 to 90% by weight of at least one copolymer produced with the components
(B21) from 60 to 85% by weight of at least one vinylaromatic monomer,
(B22) from 15 to 40% by weight of at least one polar, copolymerizable unsaturated monomer, and
(B23) from 0 to 9% by weight of at least one comonomer, where the weight data relating to (B1) and (B2) are based on the weight of (B), the weight data relating to (B11 and B12) are based on the weight of (B1), the weight data relating to (B111), (B112), and (B113) are based on the weight of component (B11), (B121), (B122), and (B123) are based on the weight of (B12), and the weight data for (B21), (B22), and (B23) are based on the weight of (B2).

AES materials are composed of a matrix made of polystyrene and acrylonitrile and optionally other monomers. In respect of the above data relating to preferred component B, AES materials differ from ASA materials in component B11, which in the case of the AES materials can be based on ethylene homo- or copolymers. Examples of copolymers that can be used are C3-C20-alpha-olefins, preferably C3-C8-alpha-olefins. Handbuch der Technischen Polymerchemie [Handbook of Industrial Polymer Chemistry], V C H Verlag, 1993, in particular page 490, provides a detailed description of production processes for AES plastics, and also a suitable constitution for these materials.

The TPU is preferably an aliphatic TPU, where the isocyanate used is in particular hexamethylene 1,6-diisocyanate (HDI).

An adhesive is preferably applied between the foils b) and c) in order to improve the adhesion between the two foils.

Adhesives used are preferably aqueous systems based on polyurethane, and these can be single-component or two-component systems.

Single-component adhesives that can be used are mostly polyurethane dispersions. These are known and commercially available, and an example that may be mentioned here is Jowapur® 150.50 from Jowat. Two-component adhesives that can be used are mostly combinations of polyurethane dispersions, for example Jowapur® 150.30, with isocyanates, such as Jowat® 195.40 from Jowat. However, adhesives based on acrylate or on epoxy resin are also suitable for use here.

The adhesive can be applied by the conventional methods, such as spreader application, roller application, or spray application, particular preference being given here to the spray application process. A drying time of 20 minutes at room temperature after application of the adhesive is sufficient for the systems described.

It is also possible that the location of the adhesive is on one of the foils b) and c), preferably on the foil c). A two-layer foil with an adhesion promoter based on elastomeric styrene-butadiene block polymers is particularly suitable, examples of these being described in WO-A 96/23823 and WO-A 97/46608 for the coating of rigid foams by the process of the invention. When the adhesive foils mentioned are used it is generally possible to omit use of any additional adhesive. It is preferable to use coextruded two-layer foils composed of a backing layer, for example polystyrene, HIPS, ASA, polyamide, polypropylene, polyethylene, or polyester, and of an adhesion-promoter layer made of an elastomeric thermoplastic, such as the styrene-butadiene block polymers mentioned.

The dimensions of the composite elements are generally from DIN A4 format up to a few square meters. The layer thickness of the composite elements usually ranges from 50 to 2000 mm.

The production of composite elements preferably uses the process described in WO 01/32400.

Said process generally comprises the steps of
provision of a core,
application of the layer b),
arrangement of the coated core made of foam or of a porous material a) in a chamber with at least one foil c) and securing of the same, with separation between the foil c) and the coated core,
evacuation of the air from the chamber,
heating of the plastics foil c), and
pressing the plastics foil c) on to the surface of the coated core a), and
removal of the composite element.

In many cases the layer b) can be applied to the core a) in a separate process.

When foils are used as outer layer b), the application of the foil used as outer layer b) can also take place immediately prior to introduction into the apparatus for application of the foil c).

It is also possible to apply the foils b) and c) in the same apparatus.

If the intention is to evacuate the core a), the evacuation process and the sealing with component b) can take place prior to application of the foil c).

A process of this type would comprise the steps
a1) provision of a core made of foam or of porous material a),
b1) use of a foil b) to sheath the core,
c1) evacuation of the core a) and airtight sealing of the foil b),
d1) arrangement of the coated core a) in a chamber with at least one foil c) and securing of the same, with separation between the foil c) and the coated core,
e1) evacuation of the air from the chamber,
f1) heating of the plastics foil c), and
g1) pressing the plastics foil c) on to the surface of the coated core a),
h1) removal of the composite element.

In another embodiment of the process of the invention, the core-evacuation process can take place in the apparatus for application of the foil c).

A process of this type would comprise the steps of:
A) provision of a core made of foam or of porous material a),
B) use of a foil b) to sheath the core,
C) arrangement of the coated core a) in a chamber with at least one foil c) and securing of the same, with separation between the foil c) and the coated core,
D) evacuation of the air from the chamber,
E) airtight sealing of the foil b),
F) heating of the plastics foil c), and
G) pressing of the plastics foil c) on to the surface of the coated core a),
H) removal of the composite element.

This embodiment of the process of the invention is simpler than separate application of component b) to the core a), and takes less time.

Between steps d) and e) it is preferable to apply an adhesive to the coated core and/or the foil c).

It is preferable that, in step f), the foil c) is heated beyond the softening point.

It is preferable that steps b) and c) are undertaken in the same apparatus.

For the process of the invention for the bilateral coating of the core a) with a plastics foil it is essential that
the molding is arranged and secured in a capsule between foils, with separation,
the air is evacuated from the capsule, and
the foils are thus pressed on to opposite areas of the molding, while a vacuum is maintained between the foils. This reduces the risk of surface defects, such as creases or misalignments.

The foils c) can be applied on one side of the composite element. It is preferable that a foil c) is applied on two opposite sides of the molding. The foil c) here can be flush with the edge of the molding, and in another embodiment of the invention the foil c) can have been deflected over the edge of the molding. The foil c) can also completely surround the molding here.

The composite elements of the invention are versatile. By way of example, they can be used in the construction industry, for example in the thermal insulation of buildings. The foil c) here serves not only for decorative purposes but also to protect the core a) from the effects of weathering.

Desired properties of the composite element can be achieved as desired, for example in relation to flame retardancy, by virtue of the different outer layers b).

The moldings of the invention can be used with particular advantage in the production of refrigeration equipment. The composite elements can be produced in the shape of the walls and doors of refrigeration equipment. Said components can then be assembled to give the finished refrigeration equipment, thus considerably simplifying the production of the refrigeration equipment. Here again, the color and the decorative effect of the refrigeration equipment can be varied via the foil c). Protection of the surface is also achieved.

The use of evacuated composite elements can moreover reduce the thermal conductivity of the refrigeration equipment.

The invention claimed is:

1. A process for producing a composite element comprising a core comprising a foam or a porous material, a first foil, a second foil comprising a thermoplastic, the second foil being different from the first foil, and an adhesive between the first foil and the second foil, the process comprising:
sheathing the core with the first foil;
evacuating the core to obtain airtight sealing of the first foil;
placing the obtained sealed, coated core in a chamber with the second foil with separation between the second foil and the sealed, coated core;
applying an adhesive to at least one of the sealed, coated core and the second foil;
evacuating air from the chamber;
heating the second foil;
pressing the second foil on to a surface of the sealed, coated core; and
removing the obtained composite element from the chamber.

2. The process according to claim 1, wherein heating the second foil comprises heating beyond a softening point of the second foil.

3. The process according to claim 1, wherein the core is sheathed with the first foil and the core is evacuated to obtain airtight sealing in the same apparatus.

4. The process according to claim 1, wherein the core comprises a foam selected from the group consisting of a melamine-formaldehyde foam, a rigid open-cell polyurethane foam, and a rigid closed-cell polyurethane foam.

5. The process according to claim 1, wherein the core comprises an aerogel.

6. The process according to claim 1, wherein the first foil is selected from the group consisting of a gas barrier layer, a flame-retardant layer, and a mechanically supportive layer.

7. The process according to claim 1, wherein the first foil is a metal foil or a metal-composite foil.

8. The process according to claim 1, wherein the first foil is a multilayer composite foil with a metal layer applied by metallization or by lamination.

9. The process according to claim 8, wherein the metal layer of the first foil comprises aluminum.

10. The process according to claim 1, wherein the second foil is provided only at two opposite sides of the composite element.

11. The process according to claim 1, wherein the second foil comprises a material selected from the group consisting of polyvinyl chloride, styrene copolymer, polypropylene, polyvinylidene fluoride, thermoplastic polyurethane (TPU), polymethyl methacrylate (PMMA), and a mixture of thermoplastic polyurethane and styrene copolymer.

* * * * *